(12) United States Patent
Brixey et al.

(10) Patent No.: US 10,579,737 B2
(45) Date of Patent: Mar. 3, 2020

(54) NATURAL LANGUAGE IMAGE EDITING ANNOTATION FRAMEWORK

(71) Applicant: Adobe Inc., San Jose, CA (US)

(72) Inventors: Jacqueline Brixey, Los Angeles, CA (US); Walter W. Chang, San Jose, CA (US); Trung Bui, San Jose, CA (US); Doo Soon Kim, San Jose, CA (US); Ramesh Radhakrishna Manuvinakurike, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 192 days.

(21) Appl. No.: 15/913,064

(22) Filed: Mar. 6, 2018

(65) Prior Publication Data

US 2019/0278844 A1 Sep. 12, 2019

(51) Int. Cl.
*G06F 17/24* (2006.01)
*G06F 17/27* (2006.01)
*G06F 17/30* (2006.01)
*G06F 3/0484* (2013.01)

(52) U.S. Cl.
CPC ...... *G06F 17/2785* (2013.01); *G06F 3/04842* (2013.01); *G06F 17/241* (2013.01); *G06F 17/278* (2013.01)

(58) Field of Classification Search
None
See application file for complete search history.

(56) References Cited

U.S. PATENT DOCUMENTS

| 6,915,254 | B1* | 7/2005 | Heinze | G06F 17/27 |
| | | | | 704/9 |
| 9,666,208 | B1* | 5/2017 | Rubin | G06F 17/21 |
| 2009/0094190 | A1* | 4/2009 | Stephens | G06Q 10/10 |
| 2009/0094579 | A1* | 4/2009 | Na | G06F 17/211 |
| | | | | 717/110 |

(Continued)

OTHER PUBLICATIONS

Antol, Stanislaw, et al., "VQA: Visual Question Answering", In Proceedings of the IEEE International Conference on Computer Vision, 2015, pp. 2425-2433.

(Continued)

*Primary Examiner* — Seong-Ah A Shin
(74) *Attorney, Agent, or Firm* — Brake Hughes Bellermann LLP

(57) ABSTRACT

A framework for annotating image edit requests includes a structure for identifying natural language request as either comments or image edit requests and for identifying the text of a request that maps to an executable action in an image editing program, as well as to identify other entities from the text related to the action. The annotation framework can be used to aid in the creation of artificial intelligence networks that carry out the requested action. An example method includes displaying a test image, displaying a natural language input with selectable text, and providing a plurality of selectable action tag controls and entity tag controls. The method may also include receiving selection of the text, receiving selection of an action tag control for the selected text, generating a labeled pair, and storing the labeled pair with the natural language input as an annotated natural language image edit request.

20 Claims, 4 Drawing Sheets

(56) References Cited

U.S. PATENT DOCUMENTS

| | | | | |
|---|---|---|---|---|
| 2016/0048655 | A1* | 2/2016 | Maitra | G06F 19/3456 705/3 |
| 2016/0124927 | A1* | 5/2016 | Fink | G06F 16/3344 715/232 |
| 2016/0147399 | A1* | 5/2016 | Berajawala | G06F 17/241 715/753 |
| 2016/0147891 | A1* | 5/2016 | Chhichhia | G06F 16/93 707/734 |
| 2016/0162464 | A1* | 6/2016 | Munro | G06F 16/243 704/9 |
| 2016/0180735 | A1* | 6/2016 | Clark | G09B 5/02 434/236 |
| 2018/0060302 | A1* | 3/2018 | Liang | G06F 17/277 |
| 2018/0082122 | A1* | 3/2018 | Verdejo | G06K 9/00577 |

OTHER PUBLICATIONS

De Vries, Harm, et al., "GuessWhat?! Visual object discovery through multi-modal dialogue", In Proc. of CVPR, Jul. 21, 2017, pp. 5503-5512.

Huang, Ting-Hao (Kenneth), et al., "Visual Storytelling", arXiv:1604.03968v1, Apr. 13, 2016, 7 pages.

Krishna, Ranjay, et al., "Visual Genome: Connecting Language and Vision Using Crowdsourced Dense Image Annotations", arXiv:1602.07332v1, Feb. 23, 2016, 44 pages.

Kulkarni, Girish, et al., "Baby Talk: Understanding and Generating Image Descriptions", In Proceedings of the 24th CVPR, 2011, 8 pages.

Lin, Tsung-Yi, et al., "Microsoft COCO: Common Objects in Context", arXiv:1405.0312v3, Feb. 21, 2015, 15 pages.

Mostafazadeh, Nasrin, et al., "Generating Natural Questions About an Image", arXiv:1603.06059v3, Jun. 9, 2016, 12 pages.

Mostafazadeh, Nasrin, et al., "Image-Grounded Conversations: Multimodal Context for Natural Question and Response Generation", arXiv: 1701.08251v2, Apr. 20, 2017, 13 pages.

Paetzel, Maike, et al., "So, which one is it? The effect of alternative incremental architectures in a high-performance game-playing agent.", Proceedings of the SIGDIAL 2015 Conference, Sep. 2-4, 2015, pp. 77-86.

Williams, Jason D., et al., "Fast and easy language understanding for dialog systems with Microsoft Language Understanding Intelligent Service (LUIS)", Proceedings of the SIGDIAL 2015 Conference, Sep. 2-4, 2015, pp. 159-161.

* cited by examiner

NATURAL LANGUAGE IMAGE EDITING ANNOTATION FRAMEWORK

TECHNICAL FIELD

This description relates to interacting with an image-editing program through natural language. More specifically, this description relates to generating a robust data store of annotated natural language image editing requests used to train machine learning models used in natural language image editing problems.

BACKGROUND

Image editing programs, such as ADOBE PHOTOSHOP and the like, enable human users to edit digital images. These programs enable uses to perform complex actions on any image, such as being able to crop out an object from the image, replace one area of an image with another, change lighting and shading, add in an object that did not exist before, change colors, clone areas of the image, etc. Each of these editing actions is an example of an image-editing request. An image-editing request is accomplished with one or more commands provided by the image-editing program. Conventionally, the user manually selects a command and the area(s) of the image to which the command applies using an input device, such as a mouse, a touch pad, a keyboard (virtual or physical), or a similar input device. This requires use of the input device, some level of familiarity with the commands available in the image-editing program and what they do, as well as knowledge of where to find the controls that initiate the commands in the image-editing program's user interface.

Machine learning models can be used to automate some tasks. Examples of machine learning methods include Neural Networks, Support Vector Machines (SVM), Logistic Regression, Conditional Random Field, etc. Machine learning models perform a function on provided input to produce some output value. Machine learning models require a training period to learn the parameters used to map an input to a desired output. Training can be either supervised or unsupervised. In supervised training, training examples, labeled with the desired output, are provided to the model and the model learns the values for the parameters that most often result in the desired output when given the inputs. In unsupervised training, the model learns to identify a structure or pattern in the provided input. In other words, the model identifies implicit relationships in the data. Once the training period completes, the model can be used to perform the task for which it was trained. For either supervised or unsupervised training, it is desirable to have a large number of training examples so that the model is robust and avoids bias. Obtaining sufficient training data is often a challenge.

SUMMARY

Implementations provide a framework that provides a foundation for automated image editing through natural language. Image editing through natural language requires translation of natural language image editing requests to commands understood and executable by an image-editing program. Implementations include an annotation structure used to identify action intent and other key pieces of information in a natural language image edit request (IER) as well as a tool for applying the structure to natural language image editing requests. The framework provided by disclosed implementations is used to create a corpus of training data in the form of annotated natural language requests that can be used to build powerful conversational image editing artificial intelligence, or in other words to build a machine learning model that automatically translates natural language image edit requests to image-editing program commands executable by an image-editing program. Once trained, the model can be used as an interface that enables a user to interact with the image-editing program through natural language commands.

The annotation structure of disclosed implementations includes a hierarchy of annotation tags. At an initial level, each natural language input is classified as either a comment or an image-editing request (IER). Comments are not further tagged and represent an input that lacks an action executable by an image-editing program. An input that is not a comment is a natural language IER and is tagged with at least one action tag. Action tags map to a command that is understood by the image-editing program, such as crop, add, delete, undo, save, etc. The action tag is associated with one or more words in the natural language IER. In addition to action tags, a second level of the annotation structure also includes entity tags. The entity tags identify information about how the action is applied to the image. Such information includes a region of the image to which the action applies, what is to be modified, how it is to be modified, etc. Each entity tag is also associated with one or more words of the natural language IER. Each natural language IER can have zero or more entity tags and multiple tags may be applied to the same words of the IER text. The annotation tool is a user interface that enables a user to apply the structure to natural language input. The tool can be used by crowdsource workers or by trained users. The tool may enforce the hierarchy, e.g., by not allowing an input to be marked with both a comment tag and an action tag. Using the tool, a group of users may generate a corpus of annotated natural language IERs. In some implementations this corpus can be used to train a machine-learning model to apply annotation tags to additional natural language input. In an inference mode, the machine-learning model can be used to generate a much larger corpus of annotated natural language IERs. As many machine learning problems require a very large corpus of training data to achieve a quality model, this enhanced corpus can serve as training data for other machine-learning model that translate a natural language input, or alternatively an annotated natural language IER to a command or commands that can be executed by the image-editing program. The training data is an initial building block and training of the other networks (that result in executable commands) is beyond the scope of this disclosure.

The details of one or more implementations are set forth in the accompanying drawings and the description below. Other features will be apparent from the description and drawings, and from the claims.

DETAILED DESCRIPTION

Figure 1:
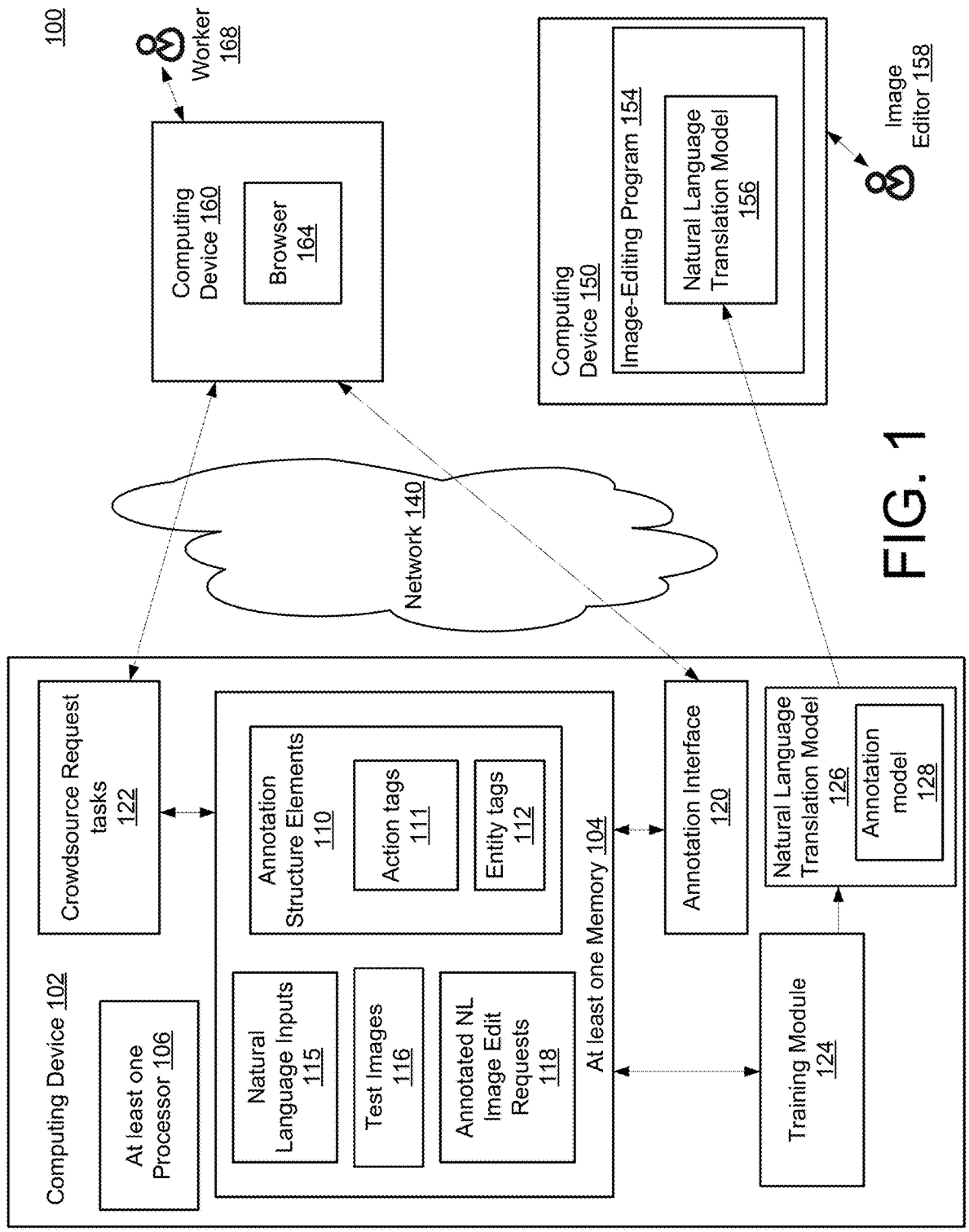
FIG. 1 is a block diagram of a natural language image editing request annotation system, according to an implementation.

Systems and methods use an annotation framework to identify key pieces of information in a natural language input intended to be an image edit request so that the request can, eventually, be translated to a command executable by an image-editing program. The framework includes a structure for categorizing a natural language input as an image edit request or a comment. The structure also tags words in the input as relating to various parts of an image edit request, such as an action to be performed, a location in the image the action affects, properties affected by the action, what degree to apply to the action and/or properties, objects to add or remove from the image, etc. The structure may also include a tag that flags one or more words of the natural language input as providing an intended goal. The annotation structure provides an intermediary language between the vocabulary used in a natural language input and editing functionality available in image-editing programs. This intermediary language is a foundation to support other machine-learning tasks. Implementations also include a tool in the form of a user interface that enables a user to apply the structure to natural language inputs. The user interface can be used in crowdsource environment, which accelerates the process of annotating the data.

As used herein, natural language refers to conversational language. Put another way, natural language requests are words that a human would use in conversation with another human when making a request. Natural language requests, also referred to as natural language inputs, are not limited to certain vocabulary. This increases the difficulty of determining what equivalent image editing commands the speaker intends as there can be a wide variety in the words used to express the same intended action. For this reason natural language requests differ from conventional voice commands, which are pre-determined words used to invoke a specific action. While both voice commands and natural language input can be obtained via talk-to-text technology, interpretation of voice commands requires only voice recognition; interpretation of natural language inputs requires not only voice recognition, but also language understanding.

As use herein, natural language input can be obtained either via talk-to-text technology or via an input device such as a virtual or physical keyboard, as the purpose of the input for this disclosure is to receive annotations.

As used herein, an image refers to any digital representation of an image, in any format and of any resolution. As used herein, an image editing program is any program used to edit images, i.e., to change the digital representation. Examples of image editing programs include ADOBE PHOTOSHOP, ADOBE ILLUSTRATOR, WINDOWS PHOTO GALLERY, MICROSOFT PAINT, PAINTSHOP PRO, etc. Each image-editing program has commands used to perform edits on images. For example, the image-editing program may have an UNDO command that reverts a most recent change, a CROP command that trims off and discards portions of the image, a ROTATE command that rotates the image by some specified degree, etc. The edits are also referred to as actions. The difficulty in interacting with an image-editing program using natural language requests is interpreting not only which action or combination of actions the speaker intends but also what parameters apply to the action.

As used herein, annotation tags represent any method of marking one or more words from a natural language input as representative of key information to an edit request. Annotation tag is a term used to represent various tags in the annotation structure used to define image edit requests. One of the annotation tags is an action tag. An action tag corresponds with one command that can be executed by the image-editing program. Words from a natural language input associated with an action tag represent different ways of expressing the intent of the speaker to have the image-editing program perform the action. The action tag includes an indication of the image editing command to be performed. The action tag may also include some indication that the tag is an action tag. For example, the action tag may have the form of "action=crop" or "a:crop" or just "crop." Each action tag and the words associated with the action tag are an example of a labeled pair. In some implementations, each image-editing request has one action tag. In such implementations, if a natural language input includes more than one action to be performed, the system will split the natural language input into two image edit requests. Table 1 illustrates a non-exhaustive list of action tags and an example of how such an action may be phrased in a natural language request.

TABLE 1

| Action | Definition | Example Natural Language Input |
| --- | --- | --- |
| Delete/remove | selects and removes an object in the image, does not place anything in resulting hole | Totally remove the elephant from the photo |
| Crop | crops an image | Crop out everything but the little boy |
| Add | inserts a novel item to the image | Add a Scooby Doo sticker to the person's skateboard |
| Adjust | increases or decreases the characteristics of the image, such as saturation or exposure or blurriness | Add more contrast to the image |
| Transform | changes the orientation of an image, such as by flipping | Flip the image horizontally |
| Rotate | changes the orientation of an image by rotating it by a certain degree or by an angle offset | The image could be made better by rotating it 90 degrees |
| Replace | removes a source object and adds a destination object in the source's location; both objects must be specified | Change the background to something from Hawaii Remove the dog and fill in with the grass |

TABLE 1-continued

| Action | Definition | Example Natural Language Input |
|---|---|---|
| Undo | undo the previous action(s) | Go back. |
| Redo | redo the previous action(s) | |
| Apply | Related to auto enhancements, such as filters or auto correction, in the image editing tool | Use a sepia filter |
| Clone | Replicates an object already existing in the image | Copy the fried thing under the soy sauce and use it to cover the blank spot of plate between rice and bowl |
| Select | Bounding box on an object | Select the dog |
| Swap | Switching locations of two objects without deleting either | Change the dog with the cat |
| Move | Relocates an object and needs to be replaced with background | Put the two girls closer together |
| Merge | Merges layers | Make them look going very fast maybe placed with overlapping images merging time frames into one frame |
| Zoom | magnifies or zooms out on an image | |
| Scroll | moves through the viewing space via up, down, left, or right scrolling | |
| Other | action is not executable due to unclear wording or requests a change in how the photo was originally taken | use HD camera |

As used herein, annotation tags include one or more entity tags. Entity tags identify in the natural language input words that correspond to information about how the action is applied to the image. For example, an entity tag may mark the words in a natural language input that indicate that a saturation level is to be adjusted and by how much or that an object is to be added, deleted, or enlarged. Entity tags include an attribute tag. The attribute tag corresponds to properties of the image to be changed. Example attributes include saturation, hue, brightness, top side, left side, etc. The attribute tag may have any form that marks a word or words of the natural language input as related to these properties. Each attribute tag and the word or words identified by the attribute tag are considered a labeled pair.

Entity tags may also include object tags. Object tags identify an object that is requested to be added to an image, removed from an image, or transformed. For example, the object tag may be associated with the word ball in the natural language input "Include a ball on the table." In some implementations, when the action is a replace action, objects may be tagged as a source object or a destination object. For example in the natural language input "replace the bat with a hockey stick" the bat may be tagged as a source object and hockey stick may be tagged as a destination object. The object tag can have any form that marks a word or words of the natural language input as relating to an object. Each object tag and the word or words identified by the object tag are considered a labeled pair.

Entity tags may include a location tag. The location tag identifies where in the image the action is to be applied. For example, the right corner in the natural language input "brighten the right corner" is an example of a location within the image, as is near the girl in the natural language request "move the dog near the girl." The location indicates what region of the picture is affected by the action, so the location tag can also be referred to as a region tag. As with other entity tags, the location tag can take any form that marks a word or words of the natural language input as relating to the region of the image to be modified by the action. Each location tag and the word or words it identifies are considered a labeled pair.

Entity tags may include a modifier/value tag. The modifier/value tag identifies any words in the natural language input that adjusts the action, modifies an object, indicates degree and/or direction for the action, or indicates a specified value. Examples of modifiers/values include increase, decrease, a little, a lot, all, up, down, to the side, to the left, green, diagonally, bluer, darker, higher, etc. Modifier/value tags may use any form that marks a word or words in the natural language input as relating to how much, how little, what direction, etc. the action should take. Each modifier/value tag and the word or words that it identifies are a labeled pair.

In some implementations, the entity tags may include an intention tag. The intention tag identifies words in the natural language input that represent a condition satisfying the intention of the speaker in performing the action. The intention provides insight into the goal of the user. Intentions themselves are not actionable (unlike the other entity tags and the action tags) but provide additional reasoning for the change. The intention tag can use any form that identifies a word or words from the natural language input as the reason for the requested action. Each intention tag and the word or words it identifies are considered a labeled pair.

In some implementations, the annotation tags may include a comment tag. The comment tag applies to the entire natural language input and indicates that the natural language input does not correspond to an executable action in the image-editing program. In other words, if an image-editing program could not perform what is requested, the natural language input can be marked as a comment. The comment tag and the entire natural language input are considered a labeled pair. Annotated natural language image edit requests have no other labeled pairs, so identifying a word in the natural language input as a comment may remove or delete previously generated labeled pairs. Comments can be used to train a machine learning annotation process how to identify input that cannot be further annotated. Such examples may be referred to as negative training examples, or in other words of what not to annotate.

As used herein, controls represent any user interface mechanism used for selection. Examples of controls include buttons, checkboxes, radio buttons, hyperlinks, etc. Annotation controls can be used in a user interface to apply a tag to a word or words in the natural language input. For example, the user may select a word and then select a button that corresponds with the object tag. The result of the selection is the system associating the selected word with the object tag, i.e., creating a labeled pair. Of course, the control may also be selected first, e.g., a radio button, and then the word selected, with the same result of creating a labeled pair. As used herein, a labeled pair is an annotation tag associated with one or more words from a natural language input.

As used herein, an annotated natural language image edit request is a data structure that associates one or more labeled pairs with the natural language input. In some implementations, the annotated natural language image request represents one image edit action. Put another way, each annotated natural language image edit action may include only one action tag labeled pair. Besides the action tag labeled pair, such annotated natural language image edit requests may include one or more additional labeled pairs. The additional labeled pairs, if any, represent entities, e.g., objects, attributes, locations, modifiers, intentions, etc.

As used herein, machine learning models refer to computational models that use a mapping function to provide an output given an input. Examples of machine learning models include, but are not limited to, Neural Networks, Support Vector Machines (SVM), Logistic Regression, Conditional Random Field, etc. Training a machine learning model is using training examples, each example being an input and a desired output, to let the model, over a series of iterative rounds, determine optimal parameter values in a mapping function that results in the model providing the desired output given the input. During each round, the parameters in the mapping function are adjusted to address incorrect output. Once trained, the model can be used to predict an output based on provided input. For example, annotated natural language image edit requests may be used to train a machine learning model to predict labeled pairs (action tags and entity tags) for newly encountered natural language edit requests.

Details of the systems and techniques are discussed below with respect to the illustrated figures. FIG. 1 is a block diagram of a natural language image editing request annotation system 100. The system 100 includes a computing device 102 having at least one memory 104, at least one processor 106. The system 100 includes one or more modules, such as training module 124, crowdsource request tasks 122, and annotation interface 120. The computing device 102 may communicate with one or more other computing devices, e.g., computing device 150 and computing device 160 over a network 140. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple distributed computing devices in communication with one another, such as multiple servers in communication with one another being utilized to perform its various functions over a network.

The at least one processor 106 may represent two or more processors formed in a substrate on the computing device 102 executing in parallel and utilizing corresponding instructions stored using the at least one memory 104. In some implementations, the at least one processor 106 may be a specialized processor, e.g. a graphics processing unit (GPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement disclosed embodiments, the at least one memory 104 may be used to store data, such as one or more of the natural language inputs 115, test images 116, annotated natural language (NL) image edit requests (IERs) 118, and annotation structure elements 110, and natural language translation model 126. The at least one memory 104 may also be used to store processes and modules, such as training module 124, crowdsource request tasks 122, and annotation interface 120, etc., and their components.

The crowdsource request tasks 122 may be tasks performed by crowdsource workers. For example, a worker may sign up to perform tasks offered by crowd-source websites, such as MECHANICAL TURK (https://mturk.com). Each crowdsource task may ask the worker 168 to view one of the test images 116 and to provide edits they would want to see in the image, phrased as requests in natural English. In some implementations, the task may include providing a minimum number of such edits, e.g., five unique edits. In some implementations, each test image 116 may be provided to a minimum number of different workers 168, so that a variety of edits can be collected from different workers. The unique edits are stored as natural language inputs 115. Each natural language input 115 is associated with the test image 116 shown to the worker 168 who provided then natural language input.

The system may include annotation interface 120. The annotation interface 120 generates and manages a user interface that enables a user to apply annotation structure elements 110 to the natural language inputs 115, generating annotated natural language image edit requests 118. In some implementations, the annotation interface 120 may be made available to a group of trained users. In some implementations, the annotation interface 120 may also be provided as part of a series of crowdsource request tasks 122. The annotation interface 120 may display a test image 116 and its associated natural language inputs 115. The annotation interface 120 includes controls that enable the user to select text in the natural language inputs 115 and apply one or more annotation structure elements 110, e.g., an annotation tag, to the text. The annotation structure elements 110 include a plurality of action tags 111 and entity tags 112. The action tags 111 are mapped to a command that can be performed by the image-editing program. Thus, once a natural language input is paired with an action tag, the natural language input is also paired with the command. The entity tags 112 represent information about how the particular action should be applied. The entity tags 112 can include object tags, location tags, modifier/value tags, intention tags, and/or attribute tags. The annotation structure elements 110 may also include a comment tag. A comment tag identifies a natural language input as lacking an action that can be completed by the image-editing program. Each time the user applies one of the annotation structure elements 110 to one or more words of a natural language input, the annotation interface 120 generates a labeled pair. The labeled pair includes the annotation tag selected and the text to which it applies. The annotation interface 120 enables the user to indicate when tagging is complete. When tagging is complete, the annotation interface 120 generates a annotated natural language image edit request 118 from the labeled pairs for the natural language input. Each annotated natural language image edit request is associated with a natural language input and includes either a comment tag or one action tag.

The training module 124 may be configured to use the annotated natural language image edit requests 118 to train a natural language translation model 126 to translate the natural language input to commands that can be executed by an image-editing program, such as image-editing program 154. The natural language translation model 126 may include or be in communication with an annotation model 128. The annotation model 128 is a machine learning model that applies the annotation structure elements 110 to natural language inputs 115. In an inference mode, the annotation model 128 takes as input a natural language input and provides as output labeled pairs for the natural language input. In a training mode, the annotation model 128 takes as input the annotated natural language image edit requests 118, i.e., a natural language input and the labeled pairs for the natural language input. During training, the annotation model 128 learns to provide the labeled pairs given the natural language input. Once trained, the annotation model 128 can be used to automatically annotate additional natural language inputs 115. Thus, in an inference mode the annotation model 128 can augment the annotated natural language image edit requests 118 so that the system 100 includes a large corpus of such requests. The training module 124 can use the large corpus, along with additional information that is not in the scope of this disclosure, to train a natural language translation model 126 to generate executable commands that accomplish the edit request. In other words, an image-editing program 154 can use the natural language translation model 126 to interact with an image editor 158 using natural language requests. In some implementations, the natural language translation model 126 may be accessed at a server, e.g., computing device 102. A content creator 158 may use computing device 150 to access the natural language translation model 126 via network 140, for example. In some implementations the natural language translation model 126 may be pushed or downloaded to a client device, such as computing device 150. The computing device 150 may store a local copy 156 of the natural language translation model 126. Natural language translation model 126 functions the same as the natural language translation model 156, so reference to one in an inference mode is considered a reference to either.

Figure 2:
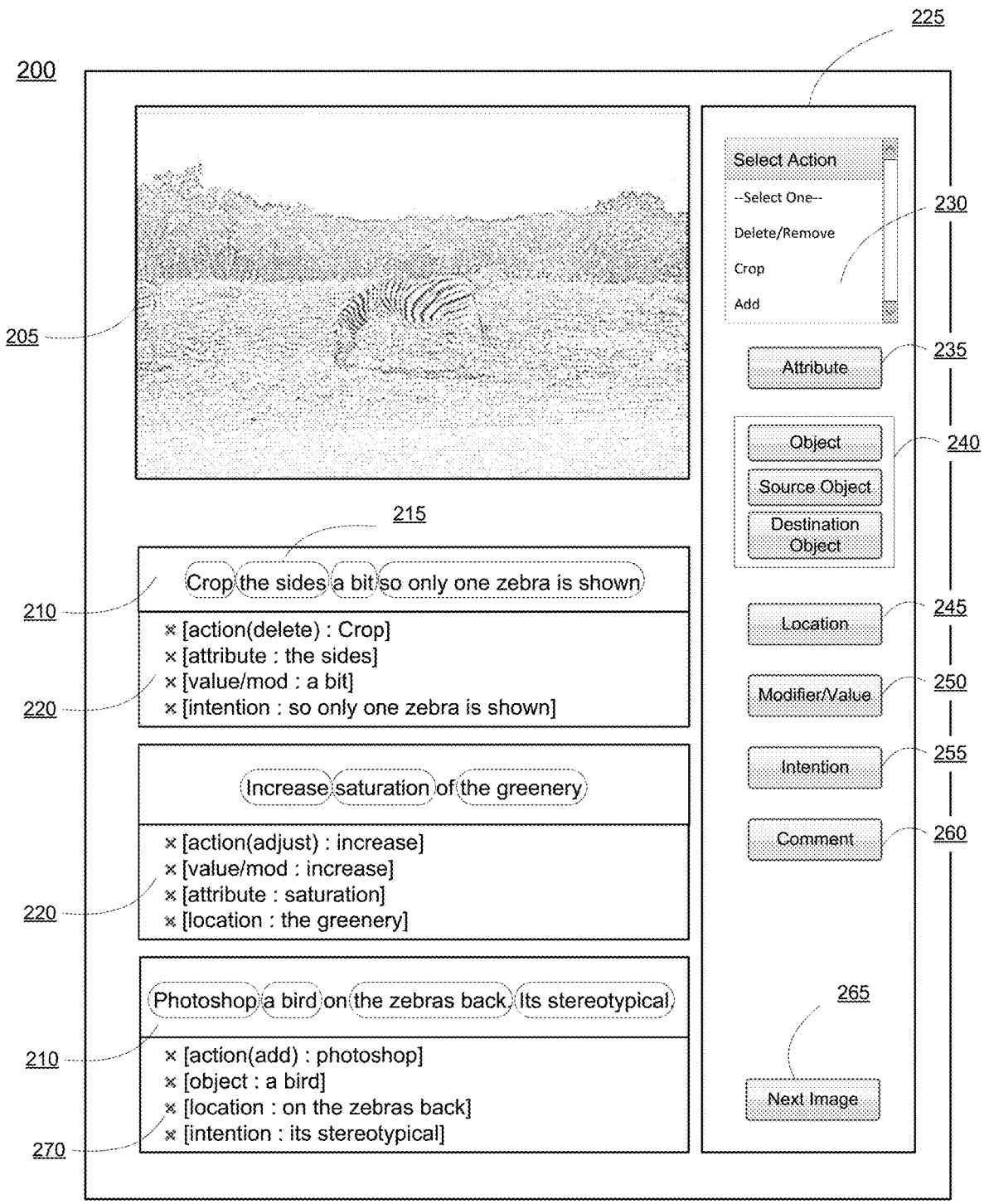
FIG. 2 is an example user interface used to apply the annotation structure to natural language input, according to an implementation.

FIG. 2 is an example user interface 200 used to apply the annotation structure to natural language input, according to an implementation. The user interface 200 is an example of the user interface generated by the annotation interface 120 of FIG. 1. The user interface 200 may be provided as part of a crowdsource task, may be provided to specially trained users, or a combination of these. The example user interface 200 is used to generate annotated natural language image edit requests. The annotated natural language image edit requests can be used as a first step in training machine learning models to translate natural language requests into commands that can be executed by an image editing program. Once trained, such networks would enable the user to interact with the image-editing program in a conversational manner, which greatly enhances the user experience and makes use of the program accessible to more people.

The user interface 200 includes an image display area 205 where the user is shown an image, e.g., one of the test images. The interface 200 also includes a control area 225. The control area 225 includes a plurality of annotation controls. The annotation controls include action tag controls 230. Each action tag control 230 corresponds to an action tag from the annotation structure, which is in turn mapped to a command recognized by (and executable by) the image-editing program. In the example of FIG. 2, the action tag controls 230 are items in a selectable drop-down list, but implementations can include other controls, including buttons, links, radio buttons, etc. The annotation controls may also include an attribute tag control 235. The attribute tag control 235 corresponds with the attribute tag. The attribute tag is used to identify words that describe or relate to properties of the image that are affected by the action. Properties of an image include, but are not limited to, brightness, hue, saturation, orientation, etc. The annotation controls may also include object tag controls 240. The object tag controls 240 correspond to object tags. In some implementations, the annotation structure may have one object tag used to mark all objects. In some implementations, the annotation structure may have an object tag, a source object tag, and a destination object tag. The source and destination designations may be used for actions that replace one object for another. Objects represent an item to insert, to delete, or to transform. Objects may be recognizable in an image via entity-recognition techniques. Objects represent things acted upon.

The annotation controls may also include a location tag control 245. The location tag control 245 represents the location in the image that the action applies. The location may sometimes be described using words that sound like an object, but the object itself is not modified. For example, in the natural language input "put a vase on the table" the table describes a location in the image to be modified (by adding a vase), while a vase described an object to be added. The annotation controls may also include a modifier/value tag control 250. The modifier/value tag control 250 is associated with a modifier/value tag. The modifier/value tag identifies words in the natural language input that describe a value, a degree, a direction, or other modification to the action. The annotation controls may also include an intention tag control 255. The intention tag control 255 is associated with an intention tag. The intention tag identifies words in the natural language input that describe a condition that satisfies the intention of the image edit requests. The intent is not actionable in itself, but provides insight into the end goal of the action. In some implementations, the annotation controls may include a comment tag control 260. The comment tag control 260 is associated with a comment tag. The comment tag marks an entire natural language input as non-actionable. In other words, a natural language input that does not relate to an action that an image-editing program can perform is non-actionable. One example of a natural language input that is a comment is "this picture would be better if taken with a wide angle lens."

The user interface 200 also displays one or more natural language inputs 210. The natural language inputs that correspond with the image shown in display area 205 may have been collected using crowdsource tasks or by some other means. In some implementations, the user interface 200 displays one such natural language input 210 at a time. In some implementations, the user interface 200 displays a predetermined number of natural language inputs 210. In some implementations, the user interface 200 displays all natural language inputs 210 associated with the image shown in display area 205, although the user may need to scroll to see all of the natural language inputs 210.

The user interface 200 may include a labeled pair display area 220 for each natural language input 210. The labeled pair display area 220 shows the user how the annotation tags have been applied. A labeled pair includes the annotation tag and the text to which the tag applies. In some implementations, the user interface 200 may include an indication 215 in the natural language input 210 that shows what text has been associated with an annotation tag. The indication 215 can be any way of differentiating the text, such as outlining, circling, underlining, changing the font, changing the font color, changing the background color, etc. In some indications the indication 215 may be selected based on the annotation tag. For example, text associated with action tags may be circled in blue, text associated with attribute tags may be circled in green, text associated with modifier/value tags may be circled in yellow, etc. In some implementations, the indication 215 is optional. In some implementations, the labeled pair area 220 may be optional, e.g., the appearance of the indication 215 may provide information on which annotation tag the text is associated with.

In the example of FIG. 2, the annotation tags have the format of "[<tag name>: <applicable text>]". Of course other formats are contemplated. Because action tags map to a command in the image-editing program, the command may be part of the action tag, e.g., [action(delete): . . . ] indicates that the action tag maps to the delete command. Of course, action tags may be just the command itself, such as [delete: . . . ].

To apply an annotation tag to words in the natural language input, the user interface may allow the user to select the words, e.g., via a mouse, and then select one of the annotation tag controls. Alternatively, the user interface 200 may allow the user to select the annotation tag control, which stays active until unselected, and then the user may select words to which the active annotation tag control applies. Once the user applies a tag to one or more words, the user interface may show the labeled pair, e.g., in the labeled pair display area 220. In some implementations the user interface 200 may provide a way for the user to delete one or more of the labeled pairs, e.g., using a delete control such as control 270. If a labeled pair is deleted, the system may remove the indication 215 that corresponds to the labeled pair. In some implementations if the comment tag control 260 is applied to a natural language input then existing labeled pairs are deleted. In other words, if a user were to select increase in the second natural language input and then select comment tag control 260, the system would delete the four labeled pairs illustrated in FIG. 2 and add a labeled pair for the comment tag and increase or the natural language input. In some implementations, the user interface may not allow the comment tag control 260 to be applied to a natural language input after one of the other annotation tag controls has been applied to the natural language input.

User interface 200 illustrates that implementations allow a word or words to be selected and tagged as more than one type of annotation. For example, in the second natural language input the word increase is tagged as both the action adjust and as modifier/value.

Once the user has finished annotating the displayed one or more natural language inputs, the user may indicate that tagging is complete, e.g., using control 265. In the example of FIG. 2, the control 265 serves to save the annotations and to obtain a next image, but control 265 may just serve to save the annotations. Saving the annotations is described in more detail with regard to FIG. 4. The user interface 200 may enable the user to move to a next image and/or a next natural language input and continue annotating.

Figure 3:
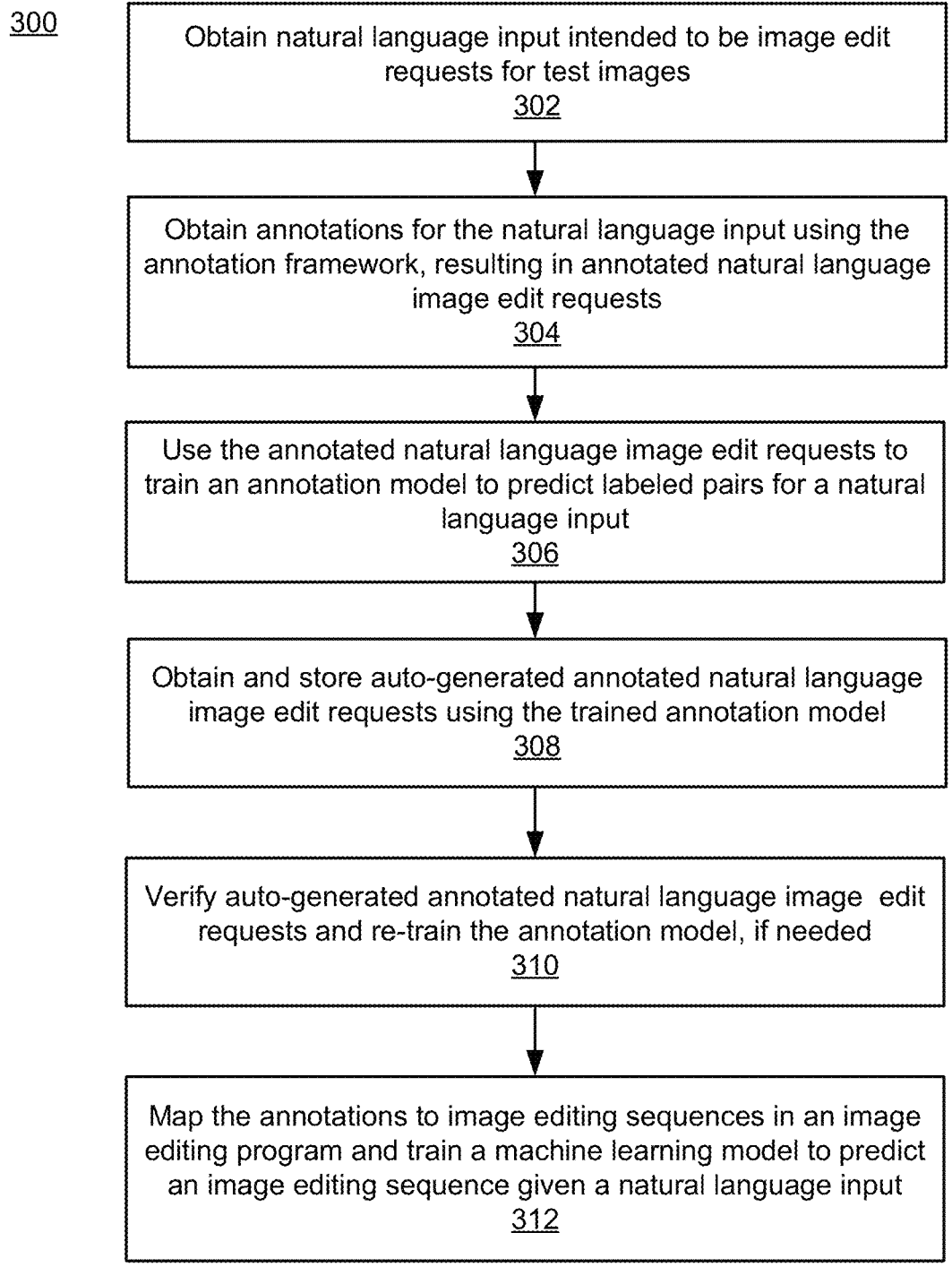
FIG. 3 is an example flowchart illustrating an example process performed by the system of FIG. 1.

FIG. 3 is a flowchart illustrating an example process 300 performed by the system of FIG. 1. Process 300 may be performed by a system such as system 100 of FIG. 1. Process 300 generates a corpus of annotated natural language image edit requests. The annotated natural language image edit requests can be used to train machine learning models. For example, the corpus can be used to train a machine learning model to generate additional annotated natural language image edit requests. This will enable the corpus to grow much faster than hand annotations, which increases the quality of the corpus for training other networks.

Process 300 includes obtaining natural language input that is intended to be image edit requests (302). For example, the system may obtain a plurality of test images and ask users to provide suggested edits to the test images. The test images are images of any digital format and can be of any subject matter. In some implementations, the system may use a crowdsource task to obtain the natural language input. For example, workers may be shown one of the images and asked to suggest edits to the image. In some implementations, the worker may be asked to provide a minimum number of edits. The workers are instructed to give the edits in natural, i.e., conversational, English. The system may obtain natural language inputs for the same image from multiple workers.

For each natural language input, the system may next obtain annotations for the natural language input (304). The annotations are labeled pairs using tags defined by the annotation structure, e.g., annotation structure elements 110. The annotations are stored as annotated natural language image edit requests. Each annotated natural language image edit request includes a natural language input and the labeled pairs that correspond with the natural language input. The system may obtain the annotations using a user interface, such as user interface 200 of FIG. 2. In some implementations, obtaining the annotations may be accomplished via a crowdsource task. In some implementations, only trained users may provide the annotations via the interface. In some implementations, trained users may review annotations obtained by crowdsource tasks.

Once a sufficient number of annotated natural language image edit requests have been obtained, the system can use these annotations to train machine learning models to perform tasks. For example, the system may train a machine learning model to predict labeled pairs given a natural language input (306). The labeled pairs for an annotated natural language image edit request represent ground truth for that natural language input. Therefore, a machine learning model can be trained to predict additional labeled pairs for additional natural language image edit requests. Once the annotation model is trained, the system may use the annotation model in an inference mode to obtain and store additional annotated natural language image edit requests (308). Such auto-generated annotated natural language image edit requests can greatly expand the corpus of annotations, which will increase the quality of other models trained using the corpus as training examples. In some implementations, the system may use human users to verify the quality of the auto-generated annotated natural language image edit requests (310). As one example, human users may be shown the labeled pairs for the annotated natural language image edit requests generated by the annotation model in an interface similar to the user interface 200 of FIG. 2. In this example, the labeled pairs may be obtained from the annotated natural language image edit requests and loaded to the labeled pair display area, so the user can edit them, if needed. Any edits may be tracked and the changes used to re-train the annotation model.

The corpus of annotated natural language image edit requests can be used to train a machine learning model to predict a sequence of image edit commands that accomplish the requested edit given the natural language input (312). To accomplish this additional information would need to be added to the annotated natural language image edit requests to interpret the tagged elements. For example, which region of an image corresponds with "the dress" to be brightened or how much to crop the image to remove the "second zebra". This additional step is beyond the scope of this disclosure, but the annotations generated by disclosed implementations provide the baseline from which such interpretations can be accomplished. In other words, without identifying the key pieces of information in the natural language input, the translation could never be performed and disclosed implementations identify those key pieces.

Figure 4:
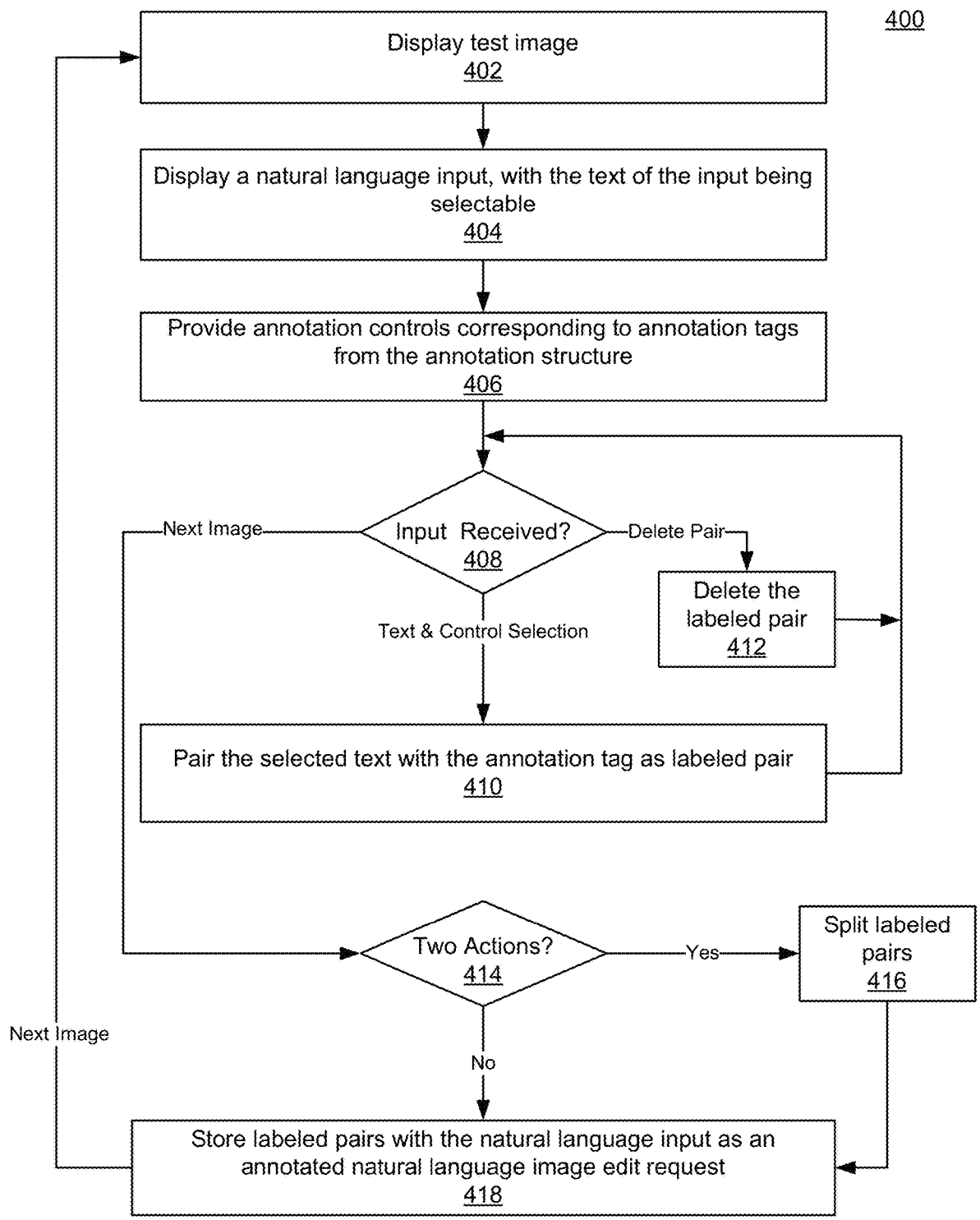
FIG. 4 is an example flowchart illustrating an example process for obtaining annotations for natural language input to generate annotated image edit requests, according to an implementation.

FIG. 4 is an example flowchart illustrating an example process 400 for obtaining annotations for natural language input to generate annotated image edit requests, according to an implementation. Process 400 may be performed as part of step 304 of FIG. 3 by a system such as system 100 of FIG. 1. Process 400 describes a process that can be implemented by a user interface, such as user interface 200 of FIG. 2. Process 400 results in the generation of labeled pairs that identify key pieces of information in a natural language input that is intended to be an image edit request.

Process 400 includes displaying a test image (402) to the user. The test image can be any digital image of any format. The system also displays a natural language input that corresponds with the test image (404). The natural language input is intended to be an edit to the image and includes text. The system displays the text in a selectable manner. The system also provides annotation tag controls, each annotation tag control corresponding to an annotation tag in the annotation structure (406). The annotation tags include a plurality of action tags. Each action tag maps to a command recognized and executable by an image-editing program. The annotation tags also include entity tags. The entity tags may include attribute tags, object tags, location tags, intention tags, and/or modifier/value tags, as described herein. The annotation tags may also include a comment tag. Each tag has a corresponding annotation tag control, which is selectable.

The system waits for an input from the user (408). The input can be selection of one or more words from the natural language input and a corresponding annotation tag control, an indication that a labeled pair should be deleted, or an indication that tagging is complete. If the input is the selection of text and a control, the system pairs the selected text with the annotation tag associated with the selected control (410). This becomes a labeled pair. Example labeled pairs are represented in labeled pair display area 220 of FIG. 2, although other formats may be used. In the special case where the annotation tag control is a comment tag control, the system may first delete any existing labeled pairs for the natural language input. The system then returns to waiting for another input. If the input is an indication that one of the existing labeled pairs should be deleted, the system may delete that labeled pair (412). Selection of the indication 270 of FIG. 2 is one example of input that represents an indication that a labeled pair should be deleted. The system then returns to waiting for another input.

If the input is an indication that tagging is complete, then the system may determine whether the labeled pairs for one natural language input include more than one action tag (414). In some implementations, an image edit request may only include one action, so if the natural language input includes more than one action tag, the system may split the labeled pairs (416). The split ensures that each annotated natural language image edit request includes a single action tag. As an example, if the system identifies two action tags in the natural language input the system may associate any other tags appearing before the second action tag with the a first image edit request and remaining tags with a second image edit request. Other methods may also be used, e.g., using natural language processing to determine which tags are associated with the action tags. It is understood that if a split occurs, step 418 is performed for each annotated natural language image edit request.

The system stores the labeled pairs and the natural language input as an annotated natural language image edit request (418). If a next image is requested, process 400 begins again at step 402 with a new image. If a next natural language input is requested (not shown), process 400 begins again at step 404. Although illustrated as displaying one natural language input at a time, process 400 may accommodate display of multiple natural language inputs for the same target image by keeping track of which natural language input is the subject of the input received at step 408. Thus step 418 may be repeated for each natural language input displayed.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

In one aspect, a computer-implemented method includes obtaining, using at least one processor, natural language inputs for a plurality of test images, each natural language input being text intended to be an image edit request and being associated with one of the plurality of test images. The method also includes, for each natural language input, displaying the text of the natural language input and the associated test image, with the text being selectable, and displaying a plurality of selectable annotation tag controls. The annotation tag controls include a plurality of action tag controls, the action tag controls each being associated with a respective action tag, the respective action tag mapping to an executable command in an image editing program and a plurality of entity tag controls, each entity tag control being associated with a respective entity tag. The method also includes repeating, until an indication that tagging is finished, receiving a selection of text and selection of an annotation tag control from the plurality of annotation tag controls, generating a labeled pair by pairing the annotation tag associated with the selected annotation tag control with the selected text, and responsive to receiving an indication that tagging is finished, storing an annotated natural language image edit request, the annotated natural language image edit request including the labeled pairs and the natural language input. The method may further include training, using the at least one processor, a machine-learning annotation model to predict labeled pairs for a natural language input using the annotated natural language image edit requests as training data.

These and other aspects can include one or more of the following features. For example, the method may also include obtaining additional natural language inputs, providing the additional natural language inputs to the machine-learning annotation model, the machine-learning annotation model generating additional annotation tag-text pairs, and storing the additional annotation tag-text pairs with respective additional natural language inputs as additional annotated natural language image edit inputs. As another example, the method may also include displaying a comment tag control associated with a comment tag, receiving selection of the comment tag control, and responsive to selection of the comment tag control deleting existing labeled pairs for the natural language input and adding the comment tag and the natural language input as a labeled pair." As another example, the annotation tags may include a location tag, the location tag corresponding to an area of the test image where an action is to be applied. As another example, the annotation tags may include a modifier/value tag, the modifier/value tag corresponding to information about the degree or direction of an action.

As another example, the annotation tags may include an object tag, the object tag corresponding to an object to be inserted or removed from the associated test image. In some implementations, the annotation tags also include a source object tag, and a destination object tag, the source object tag corresponding to an object in the image to be replaced by an object corresponding to the destination object tag. The source object tag and the destination object tag may only be active when an action tag mapped to a replace action has been selected. As another example, storing the annotated natural language image edit request may include determining that the labeled pairs include two action tags, dividing the labeled pairs into a first annotated natural language image edit request and a second annotated natural language image edit request, so that each annotated natural language image edit request has one action tag, and storing the first annotated natural language image edit request and the second annotated natural language image edit request. As another example, obtaining the natural language inputs may include generating crowdsource tasks that display the associated test image to a worker and request the worker provide a number of unique edits to the test image phrased in natural language. As another example, at least some text in at least one natural language input may be paired with two annotation tags.

In one aspect, a computer system includes at least one processor, memory storing a plurality of natural language inputs, each natural language input being associated with a test image, and memory storing instructions that, when executed by the at least one processor, causes the computer system to generate a user interface. The user interface is configured to display the natural language input and the associated test image. The natural language input is displayed with the text being selectable in the user interface. The user interface is also configured to provide a plurality of annotation tag controls. The annotation tag controls include a plurality of action tag controls, the action tag controls each being associated with a respective action tag, the respective action tag mapping to an executable action in an image editing program and a plurality of entity tag controls, each entity tag control being associated with a respective entity tag. The user interface is also configured to receive selection of text and selection of an annotation tag control of the plurality of annotation tag controls and generate a labeled pair by pairing the annotation tag associated with the selected annotation tag control with the selected text. The user interface is also configured to repeat the displaying, receiving, and generating until receiving an indication that tagging is finished and, responsive to receiving an indication that tagging is finished, store the labeled pairs with the natural language input as an annotated natural language image edit request.

These and other aspects can include one or more of the following features. For example, the user interface may be further configured to enforce identification of the natural language input as a comment or as an image edit request including at least one action tag. As another example, the user interface may be further configured to receive a second selection of text already included in a first labeled pair, receive another annotation tag that differs from the annotation tag in the first labeled pair, and generate a second labeled pair by pairing the other annotation tag with the second selection of text. The first labeled pair and the second labeled pair are stored as a single annotated natural language image edit request. As another example, the user interface may be further configured to determine, responsive to receiving the indication that tagging is finished, whether the labeled pairs include more than one action annotation tag and, responsive to determining that the labeled pairs include at least two action annotation tags, divide the labeled pairs into at least two annotated natural language image edit requests, so that each has a respective action tag. As another example, the entity tags may include a location tag, the location tag corresponding to an area of the test image where an action is to be applied, a modifier/value tag, the modifier/value tag corresponding to information about the degree or direction of an action, and/or an object tag, the object tag corresponding to an entity to be inserted or removed from the associated test image. As another example, the user interface may be further configured to provide a comment tag control that corresponds to a comment tag, wherein selection of the comment tag control deletes existing labeled pairs for the natural language input and generates a labeled pair including the comment tag and the natural language input.

In one aspect, a computer-implemented method includes displaying a test image on a display device using at least one processor, displaying text for a natural language input, the text being selectable and the natural language input being an image edit suggestion from a human user in reaction to viewing the test image, providing a plurality of action tag controls, and providing a plurality of entity tag controls. The action tag controls may each be associated with a respective action tag, the respective action tag mapping to an executable action in an image-editing program. The entity tag controls may each be associated with a respective entity tag. The method may also include receiving selection of one or more words of the text, receiving selection of an action tag control for the selection of one or more words, generating a labeled pair, and storing the labeled pair with the natural language input as an annotated natural language image edit request. The labeled pair may be the one or more words paired with the action tag associated with the action tag control. The annotated natural language image edit request can be used in training a machine-learning annotation model to predict labeled pairs a natural language inputs.

These and other aspects can include one or more of the following features. For example, the method may also include using the machine-learning annotation model to generate a set of training data, the training data including a plurality of labeled pairs predicted by the machine-learning annotation model from additional natural language inputs. The training data may be used to train a natural language image editing machine learning model to generate commands in the image editing program given the labeled pairs. As another example, the entity tags may include a location tag, an object tag, and a modifier/value tag. As another example, the labeled pair is a first labeled pair and the method may also include receiving a second selection of the one or more words, receiving selection of an entity tag control, generating a second labeled pair by pairing the entity tag associated with the entity tag control with the one or more words, and storing the second labeled pair with the first labeled pair as the annotated natural language image edit request.

According to one general aspect, a system includes at least one processor and memory storing instructions that, when executed by the at least one processor, cause the system to perform any of the operations or methods disclosed herein.

What is claimed is:

1. A computer-implemented method comprising:
obtaining, using at least one processor, natural language inputs for a plurality of test images, each natural language input being text intended to be an image edit request and being associated with a test image of the plurality of test images;
for each natural language input:
displaying the text of the natural language input, with the text being selectable, and the test image associated with the natural language input,
displaying a plurality of annotation tag controls, the plurality of annotation tag controls being selectable, the plurality of annotation tag controls include:
action tag controls, each of the action tag controls being associated with a respective action tag that maps to an executable command in an image editing program, and
entity tag controls, each of the entity tag controls being associated with a respective entity tag,
repeating, until an indication that tagging is finished, the repeating including:
receiving a selection of one or more words from the text of the natural language input and a selection of an annotation tag control from the plurality of annotation tag controls,
generating a labeled pair by pairing the one or more words with an annotation tag associated with the annotation tag control selected, and
responsive to receiving an indication that tagging is finished, storing an annotated natural language image edit request, the annotated natural language image edit request including an indication of the natural language input and the labeled pairs for the natural language input; and
training, using the at least one processor, a machine-learning annotation model to predict labeled pairs for a natural language input using the annotated natural language image edit requests as training data.

2. The method of claim 1, further comprising:
obtaining additional natural language inputs,
providing the additional natural language inputs to the machine-learning annotation model, the machine-learning annotation model generating additional annotation tag-text pairs, and
storing the additional annotation tag-text pairs with respective additional natural language inputs as additional annotated natural language image edit inputs.

3. The method of claim 1, further comprising:
displaying a comment tag control associated with a comment tag;
receiving selection of the comment tag control; and
responsive to selection of the comment tag control:
deleting existing labeled pairs for the natural language input, and
adding the comment tag and the natural language input as a labeled pair.

4. The method of claim 1, wherein the entity tag controls include a location tag control for a location tag, the location tag corresponding to an area of the test image where an action is to be applied.

5. The method of claim 1, wherein the entity tag controls include a modifier/value tag control for a modifier/value tag, the modifier/value tag corresponding to information about a degree or a direction of an action.

6. The method of claim 1, wherein the entity tag controls include an object tag control for an object tag, the object tag corresponding to an object to be inserted or removed from the test image associated with the natural language input.

7. The method of claim 6, wherein the entity tag controls include a source object tag control for a source object tag, and a destination object tag control for a destination object tag, the source object tag corresponding to an object in the test image associated with the natural language input to be replaced by an object corresponding to the destination object tag.

8. The method of claim 1, wherein storing the annotated natural language image edit request includes:
   determining that the labeled pairs include two action tags;
   dividing the labeled pairs into a first annotated natural language image edit request and a second annotated natural language image edit request, so that each annotated natural language image edit request has one action tag; and
   storing the first annotated natural language image edit request and the second annotated natural language image edit request.

9. The method of claim 1, wherein obtaining the natural language inputs includes generating crowdsource tasks that display a test image to a worker and request the worker provide a number of unique edits to the test image phrased in natural language.

10. The method of claim 1, wherein at least some text in at least one natural language input is paired with two annotation tags.

11. A computer system comprising:
   at least one processor;
   memory storing a plurality of natural language inputs, each natural language input being text and being associated with a test image; and
   memory storing instructions that, when executed by the at least one processor, causes the computer system to generate a user interface configured to:
      display a natural language input of the plurality of natural language inputs with the text being selectable and with the test image associated with the natural language input,
      provide a plurality of annotation tag controls, the plurality of annotation tag controls including:
         a plurality of action tag controls, each action tag control of the plurality of action tag controls being associated with a respective action tag that maps to an executable action in an image editing program, and
         a plurality of entity tag controls, each entity tag control of the plurality of entity tag controls being associated with a respective entity tag,
      receive selection of one or more words of the text and a selection of an annotation tag control of the plurality of annotation tag controls,
      generate a labeled pair by pairing the one or more words with an annotation tag associated with the annotation tag control selected,
      repeat the displaying, receiving, and generating until receiving an indication that tagging is finished; and
      responsive to receiving an indication that tagging is finished, store the labeled pairs with the natural language input as an annotated natural language image edit request,
      wherein the annotated natural language image edit request is used in training a machine-learning annotation model to predict labeled pairs for natural language inputs.

12. The computer system of claim 11, wherein the user interface is further configured to enforce identification of the natural language input as a comment or as an image edit request including at least one action tag.

13. The computer system of claim 11, wherein the user interface is further configured to:
   receive a second selection of text already included in a first labeled pair;
   receive another annotation tag that differs from the annotation tag in the first labeled pair; and
   generate a second labeled pair by pairing the other annotation tag with the second selection of text,
   wherein the first labeled pair and the second labeled pair are stored as a single annotated natural language image edit request.

14. The computer system of claim 11 wherein the user interface is further configured to:
   determine, responsive to receiving the indication that tagging is finished, whether the labeled pairs include more than one action annotation tag; and
   responsive to determining that the labeled pairs include at least two action annotation tags, divide the labeled pairs into at least two annotated natural language image edit requests, so that each has a respective action tag.

15. The computer system of claim 11, wherein the plurality of entity tag controls include:
   a location tag control for a location tag, the location tag corresponding to an area of the test image where an action is to be applied;
   a modifier/value tag control for a modifier/value tag, the modifier/value tag corresponding to information about a degree or a direction of an action; and
   an object tag control for an object tag, the object tag corresponding to an entity to be inserted or removed from the test image associated with the natural language input.

16. The computer system of claim 11, wherein the user interface is further configured to:
   provide a comment tag control that corresponds to a comment tag, wherein selection of the comment tag control deletes existing labeled pairs for the natural language input and generates a labeled pair including the comment tag and the natural language input.

17. A computer-implemented method comprising:
   displaying, on a display device using at least one processor, a test image;
   displaying text for a natural language input, the text being selectable and the natural language input being an image edit suggestion from a human user in reaction to viewing the test image,
   providing a plurality of action tag controls, each action tag control of the plurality of action tag controls being associated with a respective action tag that maps to an executable action in an image editing program;
   providing a plurality of entity tag controls, each entity tag control of the plurality of entity tag controls being associated with a respective entity tag;
   receiving selection of one or more words of the text;
   receiving selection of an action tag control for the one or more words selected;
   generating a labeled pair, the labeled pair being the one or more words paired with the respective action tag associated with the action tag control selected; and
   storing the labeled pair with the natural language input as an annotated natural language image edit request,
   wherein the annotated natural language image edit request is used in training a machine-learning annotation model to predict labeled pairs for natural language inputs.

18. The method of claim 17, further comprising:
   using the machine-learning annotation model to generate a training data, the training data including a plurality of labeled pairs predicted by the machine-learning annotation model from additional natural language inputs, wherein the training data is used to train a natural language image editing machine learning model to generate commands in the image editing program given the labeled pairs.

19. The method of claim 17, wherein the plurality of entity tag controls include a location tag control, an object tag control, and a modifier/value tag control.

20. The method of claim 17, wherein the labeled pair is a first labeled pair and the method further comprises:

receiving a second selection of one or more words of the text;

receiving selection of an entity tag control;

generating a second labeled pair by pairing the respective entity tag associated with the entity tag control with the one or more words selected by the second selection; and storing the second labeled pair with the first labeled pair as the annotated natural language image edit request.

* * * * *